United States Patent [19]
Kolt

[11] Patent Number: 5,860,596
[45] Date of Patent: Jan. 19, 1999

[54] AUTOMATIC TEMPERATURE CONTROLLED SHOWER HEAD ASSEMBLY

[76] Inventor: Stanley Kolt, 4 Country Rd., Mamaroneck, N.Y. 10543

[21] Appl. No.: 716,696

[22] Filed: Sep. 20, 1996

[51] Int. Cl.[6] .................................................. G05D 23/12
[52] U.S. Cl. .......................... 239/75; 234/553.3; 234/558
[58] Field of Search ........................... 239/375, 63, 553.3, 239/580, 558, 550; 236/93 B; 137/468

[56] References Cited

U.S. PATENT DOCUMENTS

| | | | |
|---|---|---|---|
| 1,930,227 | 10/1933 | Donahue | 239/75 |
| 3,856,206 | 12/1974 | Bell et al. | 239/75 |
| 4,262,844 | 4/1981 | Sekiya | 239/75 |
| 4,281,790 | 8/1981 | McGinnis | 236/93 B |

Primary Examiner—Kevin Weldon
Attorney, Agent, or Firm—Leonard W. Suroff

[57] ABSTRACT

An automatic temperature controlled shower head assembly includes a housing having an inlet port and a plurality of outlet ports to permit water to flow therethrough; a valve device operatively associated with the input port controls the volume of water flowing through the assembly depending upon the position of a temperature responsive drive mechanism mounted within the housing in operative relationship to the valve device. The drive mechanism detects temperature changes of the flowing water and acts in response to these temperature changes, within a predetermined range, wherein the valve device is moved to automatically vary the volume of water flowing from the outlet ports depending upon the temperature of the water.

22 Claims, 2 Drawing Sheets

AUTOMATIC TEMPERATURE CONTROLLED SHOWER HEAD ASSEMBLY

BACKGROUND OF THE INVENTION

1. Field of the invention

The present invention relates to shower heads, and more particularly, to a shower head valve that automatically reduces the flow of water when the water temperature flowing therethrough exceeds a certain predetermined temperature range.

2. Discussion of the Relevant Art

The prior art abounds with devices that attempt to protect individuals from being scalded when taking a shower both at home and at motels, hotels, etc. Turning the shower "ON" with the hot water valve in the open position may cause a person using the shower to be scalded before the water can be turned "OFF" or cold water added. The present invention automatically prevents this from happening and also conserves energy. The instant invention prevents a young child, for example, from inadvertently turning "ON" the shower at full hot and being injured thereby. This is prevented, since the shower head valve assembly will automatically close down the water flow within in a certain temperature range until the safe temperature is reached for full water flow.

Another feature of the present invention is that when a sudden drop in the cold water pressure occurs, resulting in a reduction of cold water volume, the ratio of cold water to hot water changes and the water temperature becomes extremely hot very quickly. The present invention overcomes this problem by reducing the water flow so that the user may take steps to preventing himself from being scalded. If the cold water thereafter returns to normal the valve assembly will gradually open and let the water flow return to its previously selected setting.

One device that attempts to overcome this problem is disclosed in U.S. Pat. No. 5,368,227 issued to McGinnis on Nov. 29, 1994. However, the device disclosed therein provides an auxiliary path for the water flow, should it become excessively hot, which could still harm the user thereof.

The patent to Kolt issued as U.S. Pat. No. 4,402,455 on Sep. 6, 1983 appeared to solve the problem but was subject to water temperature variations with changes in water pressure beyond a narrow range.

Therefore, it is an object of the present invention to provide an automatic temperature controlled shower head assembly that limits the temperature of the water flowing therethrough.

It is another object of the present invention to provide an automatic temperature controlled shower head assembly that opens and closes without the use of any electrical energy.

It is yet another object of the present invention to provide an automatic temperature controlled shower head assembly that is safe for children to use.

The foregoing and other objects and advantages will appear from the description to follow. In the description, reference is made to the accompanying drawing, which forms a part hereof, and which is shown by way of illustration with specific embodiments in which the invention may be practiced. These embodiments will be described in sufficient detail to enable those skilled in the art to practice the invention, and it is to be understood that other embodiments may be utilized and structural changes may be made without departing from the spirit and scope of the instant invention.

SUMMARY OF THE INVENTION

The present invention relates to an automatic temperature controlled shower head assembly with a first member having an inlet port and an outlet port for permitting water to flow therethrough and a cavity extending inwardly from the lower end thereof. A second member has a top end and a lower end with a cavity extending inwardly from the lower end. A plurality of channels are formed by a plurality of circumferentially extending spaced apart ribs disposed on at least one of the members proximate the lower end of the first member. A valve operatively associated with the inlet port controls the volume of water flow through the assembly depending on the position of the valve relative to the inlet port. A temperature responsive drive disposed within the housing within the channels maintains the opening between the channels and the drive so that said water may flow therethrough. The temperature responsive drive cooperates with the valve responsive to temperature changes of the water, within a predetermined range, to vary the water flowing through the inlet port dependent upon the temperature of the water. A third member has an open top end and a lower end with a cavity extending inwardly from the open top end with a shoulder disposed proximate the open top end. The third member lower end is provided with a plurality of through apertures. A pressure plate has a centrally disposed aperture and is disposed upon said third member shoulder. A U-shaped bracket or coupling is provided for connecting the first member to the third member.

If the temperature of the fluid is in the range of 100° F. (37.7° C.) the valve is open permitting maximum water flow and when it closes at about 115° F. (46.1° C.) it substantially prevents all water from flowing out of the outlet port. It has been determined that with a water source having a pressure of 40 pounds per square inch, the drive mechanism is fully opened at 110° F. instead of 118° F. However, increasing the pressure on the drive mechanism by increasing the water pressure of the water source or providing a pressure plate member to increase the water pressure on the drive mechanism to 90 pounds per square inch caused the drive mechanism to raise the water temperature to the desired temperature of 118° F. before cutting off the water flow. The pressure plate member is provided with a centrally disposed aperture of about 0.300±0.010 inches to provide the necessary back pressure allowing the shower head to function well between water pressures ranging between 40 to 90 pounds per square inch.

A coupling or U-shaped bracket retains the members in a sealed relationship to each other such that the fluid flows from the inlet port through the assembly and out from the shower head apertures. The coupling may engage a rim extending circumferentially on the members to maintain the lower ends thereof in abutting engagement with each other. The coupling may be fabricated from plastic or welded to the members, which may also be fabricated from plastic.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DESCRIPTION OF THE PREFERRED EMBODIMENTS

Figure 1:
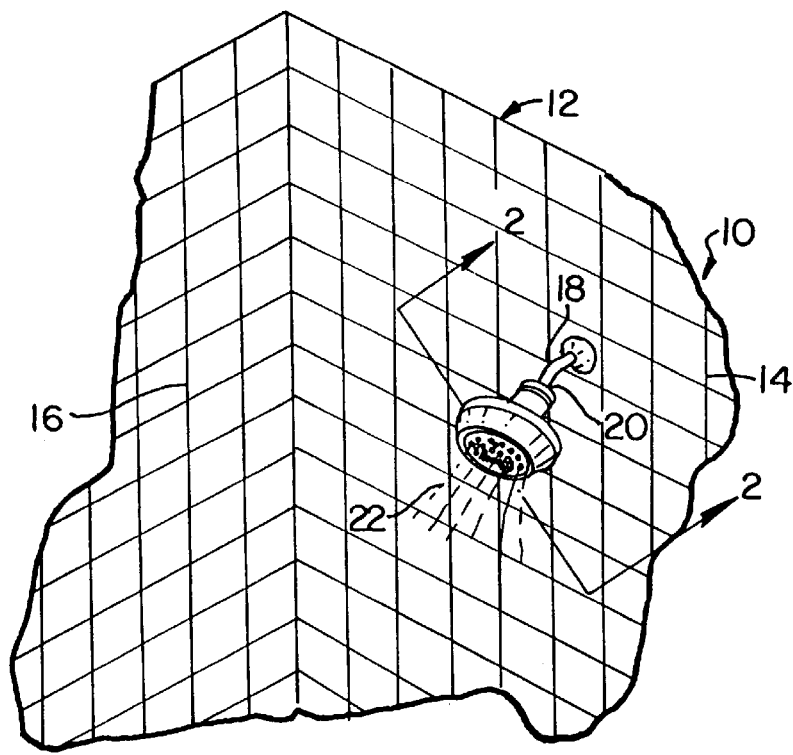
FIG. 1 is a perspective view of the automatic temperature controlled shower head assembly, according to the principles of the present invention, mounted on a wall of a shower unit.

Referring now to the drawings and in particular to FIG. 1, there is shown an automatic temperature controlled shower head assembly 10 mounted on a shower unit 12 normally found in a bathroom having walls 14 and 16 with a source of water 18 connected to the assembly 10 at one end 20 thereof. The shower head 10 may be of a conventional design or may be adapted to vary the water 22 in a spray pattern, not shown. The connection to the water source 18 (see FIG. 3) may include a swivel adapter 19 and a pair of washers 21 adapted to be received into the opening 23 provided in a bushing 56.

The present invention does not require any electrical energy to operate so it will function at all times.

Figure 2:
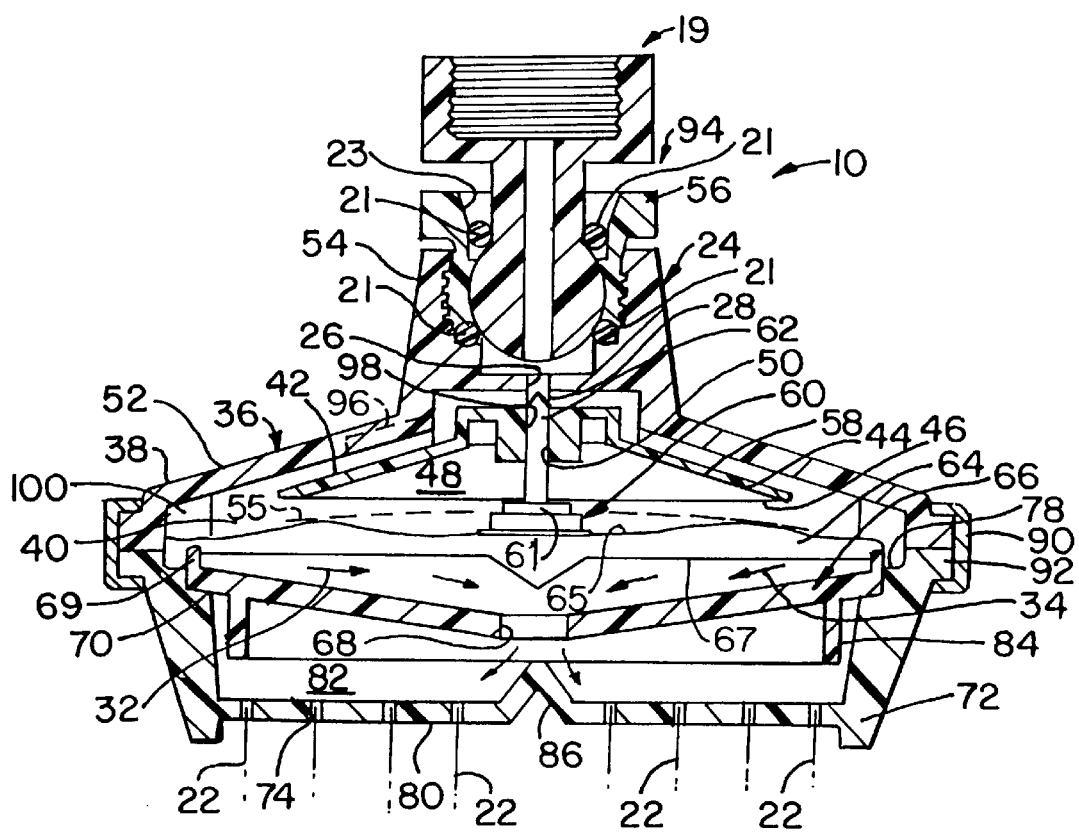
FIG. 2 is a cross-sectional view taken along line 2—2 of FIG. 1.

The shower head assembly 10, as further illustrated in cross-section in FIG. 2, includes a first housing member 24 having an inlet port 26 and outlet port 28 with an axial bore 30 disposed therebetween, so as to permit the water 22, to flow through the first member 24 between the ports 26 and 28 in the direction of arrows 32 and 34. The first housing member 24 has a top end 36 and a lower end 38 with a cavity 40 extending inwardly from the lower end 38. The inlet port 26 extends between the top end 36 and the cavity 40. The first member 24 also has an outer surface 52, that is provided with an extending portion 54 that is internally threaded to accept an externally threaded bushing 56, the purpose thereof will be explained hereinafter.

A second housing member 42 has a top end 44 and a lower end 46 with a cavity 48 extending inwardly from the lower end 46 and the outlet port 50 extends between the top end 44 and the cavity 48. The second member 42 includes grooves or channels 96 provided on the top surface 58 thereof to direct the path of water 22 to flow from the inlet port 26, through the grooves 96, over the outer surface 58 of member 42 and through the channel 100 to the outlet apertures 74 provided on the lower end 80 of the housing base member 72. The second member 42 also includes a bore 98 for receiving the valve stem 62 therein.

A valve assembly 60 is operatively associated with the outlet port 28 to control the volume of water 22 flowing through the shower head assembly 10 depending on the position of the valve stem 62 relative to the bore 98 of the outlet port 28.

The shower head assembly 10 also contains a temperature responsive drive mechanism 64, which is capable of detecting temperature changes of the water 22. The temperature responsive drive mechanism 64 is in operative relationship with the valve assembly 60, to either contract or expand in response to the temperature changes of the water 22 within a predetermined temperature range. The drive mechanism 64 has a top surface 65 that expands and contracts with temperature changes and a bottom surface 67 that remains fixed or stationary. The valve stem 62, with its base 61 being affixed to the top surface 65 of the drive mechanism 64, moves upwardly automatically, into the outlet port 28 as the water temperature rises, since the drive mechanism 64 expands, moving the top surface 65 upwardly, thereby reducing the volume of water 22 flowing from the outlet port 28. If the temperature of the water is in the range of 100° F. (37.7° C.), the valve assembly 60 is substantially open and at 115° F. (46.1° C.) the valve assembly 60 is essentially closed, preventing almost all of the water 22 from flowing out of the outlet port 28 and in turn, out of the apertures 74 of the housing base member 72 of the shower head assembly 10. When the water reaches 100° F. (37.7° C.) the valve stem 62 of the valve assembly 60 moves out of the outlet port 28 permitting the water 22 to flow freely again, automatically.

The temperature responsive drive mechanism 64 may be a device such as described in U.S. Pat. No. 4,509,922 issued to Kolt on Apr. 2, 1985, which is incorporated herein in its entirety.

A pressure plate member 66, preferably having at least a centrally disposed aperture 68 and a plurality of upwardly extending protrusions 69, rests upon an internally disposed shoulder 70 provided on the housing base member 72 that includes a plurality of through apertures 74 through which the water exits. The housing base member 72 has a top end 78 and a lower end 80 with a cavity 82 extending inwardly from the top end 78. The pressure plate member 66 may also be provided with a downwardly extending ridge 84 to help control the direction of the water flow. The function of the pressure plate member 66, as explained earlier, is to increase the water pressure on the drive mechanism to 90 pounds per square inch causing the drive mechanism 64 to move so as to raise the water temperature to the desired temperature of 118° F. before cutting off the water flow by equalizing and raising the pressure on the drive mechanism 64 when the input water pressure is reduced to 40 pounds per square inch, thereby desensitizing the shower head assembly 10 from changes in water supply pressure.

In one embodiment of the invention the lower end 80 of the housing base member 72 is provided with a centrally disposed conically shaped protrusion 86 that extends into the cavity 82 to disperse the water 22 flow.

A coupling device 90 is used to retain the first housing member 24 and the housing base member 72 in a sealed relationship to each other such that the water 22 flows from the inlet port 26 through the assembly 10 and out of the apertures 74. The coupling device 90 may be in the form of a U-shaped bracket that engages a rim 92 extending circumferentially on the members 36 and 72. The coupling device 90 maintains the ends 40 and 78 in abutting or sealed engagement with each other and may be fabricated from a plastic material and welded to the members 36 and 72, which may also be fabricated from a plastic material.

The assembly 10 further includes a ball joint coupling 94 coupled to bushing 56 for permitting connection thereof to the source of water 18.

Figure 3:
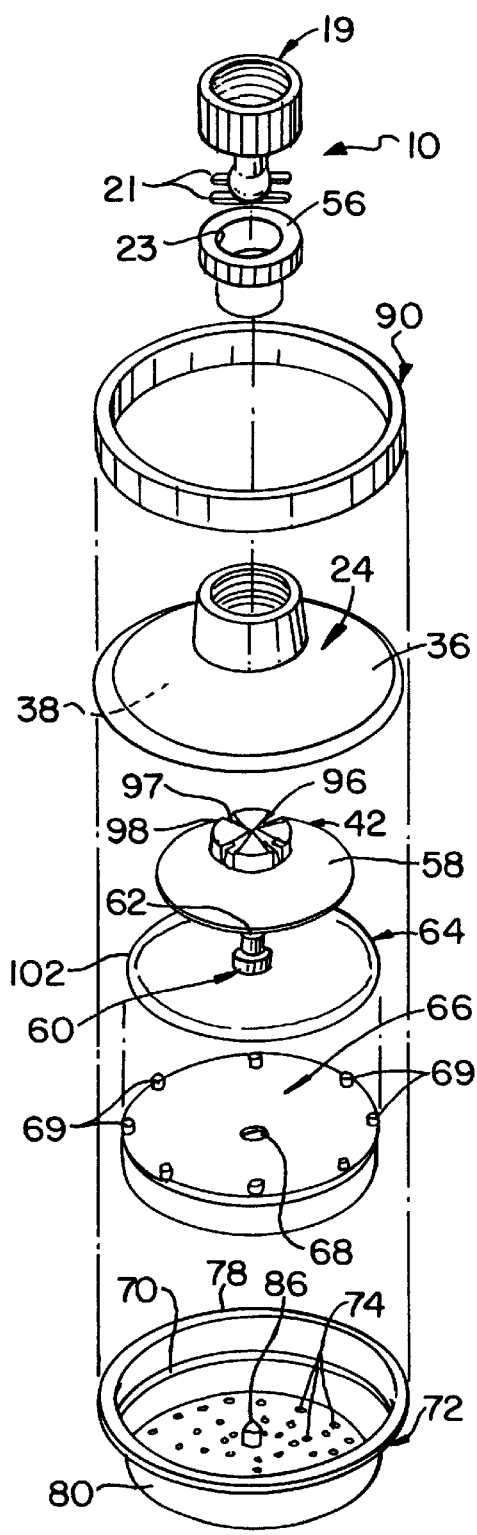
FIG. 3 is an exploded perspective view of the components of the shower head assembly shown in FIG. 1.
Figure 4:
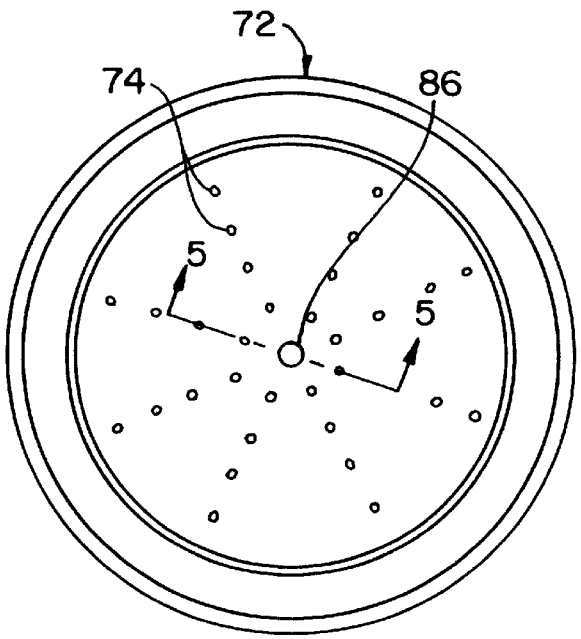
FIG. 4 is a bottom plan view of the shower head assembly.

Referring now to FIG. 3, wherein the various components of the automatic temperature controlled shower head assembly 10 is shown in an exploded view, and FIG. 4. The second member 42 terminates prior to the distal end 102 of drive mechanism 64 that the water 22 will pass over a portion of the drive mechanism 64. In this manner the temperature of the water 22 is conducted to the drive mechanism 64. If the temperature of the water 22 is for a shower and below 100° F. the drive mechanism 64 does not expand and the valve stem 62 remains in the position illustrated in FIG. 2. This permits a continuous flow of water 22 through the aperture 28, grooves 96, and guides 97.

Figure 5:
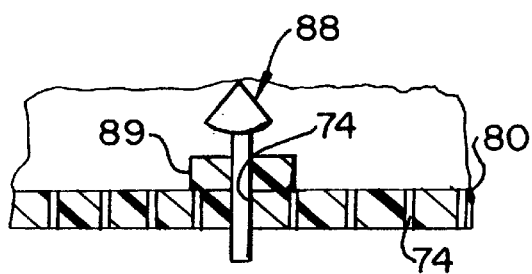
FIG. 5 is a partial cross-sectional view taken along the line 5—5 of FIG. 4 showing an alternative embodiment of the present invention.

In an alternative embodiment, shown in FIG. 5, if the water should become too hot and cease to flow, the cold water valve would be opened by the person attempting to take a shower, not shown, thereby lowering the temperature of the water 22. The retarding mechanism 88 is extended through a centrally disposed aperture 74 guide portion 89 provided in the lower end 80 of the housing base member 72 and is manually pushed upwardly to close off aperture 68 of the pressure plate member 66, thereby increasing the back pressure on the temperature responsive drive mechanism 64 causing it to compress rapidly permitting the water to flow again.

In operation, when the temperature of the water 22 exceeds the temperature of about 115° F., for a shower application, the expansion of the bellows unit drive mechanism 64 is automatically completed and the drive mechanism 64 expands to the level indicated in phantom (broken line) in FIG. 2, causing the valve stem 62 to move up into the outlet port 28 of bore 30, as illustrated therein. When this occurs the flow of water is substantially stopped. With a person still in the shower the assembly 10 has been designed to permit the cooling of part of the drive mechanism 64 to be accelerated, by using cool water for example. The dimensional relationship between the diameter of the valve stem 64 and the bore 30 is such that a minimum flow will continue. Thus, a person using the shower is able to turn "OFF" the hot water or increase the cold water to permit the drive mechanism 64 to contract. The lower temperature of the water 22 forces the valve stem 64 to retract and once again the water 22 will flow therethrough.

Hereinbefore has been disclosed an automatic temperature controlled shower head assembly that is fully open only in a prescribed water temperature range, regardless of the pressure of the water source, to protect the users thereof. Although an illustrative embodiments of the invention has been described in detail herein with reference to the accompanying drawings, it is to be understood that the invention is not limited to the precise embodiment and various changes and modifications may be made without departing from the spirit or scope of the invention.

Having thus set forth the nature of the invention, what I claim is:

1. An automatic temperature controlled shower head assembly comprising:
   A. a first housing member having an inlet port and an outlet port for permitting the water to flow through the shower head, said first housing member having top end and a lower end with a cavity extending inwardly from said first member lower end, said inlet port extending between said first member top end and said first member cavity,
   B. a second housing member having a top end and a lower end with a cavity extending inwardly from said second member lower end, said outlet port extending between said second member top end and said second member cavity and a plurality of circumferentially extending spaced apart channels disposed on at least one of said members proximate said first member lower end,
   C. valve means operatively associated with said outlet port for controlling the volume of water flow through the assembly depending on the position of said valve means relative to said outlet port;
   D. temperature responsive drive means disposed within the shower head assembly with said water flowing thereover, said temperature responsive drive means cooperating with said valve means responsive to temperature changes of said water within a predetermined range, said valve means moving to vary the water flowing through said outlet port dependent upon the temperature of said water; and
   E. a third housing member having an open top end and a lower end with a cavity extending inwardly from said open top end, said third housing member lower end being provided with a plurality of through apertures;
   F. pressure plate means, having at least one aperture, disposed upon said third housing member remote from said lower end of said third housing member; and
   G. means for connecting said first housing member to said third housing member.

2. A shower head assembly according to claim 1, wherein said channels are formed in both of said first and said second housing members proximate said first member lower end.

3. A shower head assembly according to claim 1, wherein said first member top end further includes ball joint adapter means for connecting said shower head to the end of a threaded water pipe.

4. A shower head assembly according to claim 1, wherein said third housing member lower end further includes a centrally disposed conically-shaped inwardly extending protrusion for dispersing the water flow.

5. A shower head assembly according to claim 1, wherein said second housing member lower end includes a centrally disposed through aperture.

6. A shower head assembly according to claim 5, wherein said centrally disposed through aperture has a retarding means disposed. therein for substantially closing off the flow of said water through said pressure plate centrally disposed aperture increasing the pressure on the temperature responsive drive means when said water exceeds a predetermined temperature.

7. A shower head assembly according to claim 6, wherein said retarding means is manually operated.

8. A shower head assembly according to claim 1, wherein said means for connecting said first housing member to said third housing member is a U-shaped channel means for operatively engaging outwardly extending protrusions provided on the periphery of said first housing member and said third housing member.

9. A shower head assembly according to claim 1, wherein said at least one aperture on said pressure plate means is centrally disposed.

10. A shower head assembly according to claim 1, wherein a shoulder means is provided on said third housing member proximate said third housing member open top end for receiving said pressure plate means thereon.

11. An automatic temperature controlled shower head assembly comprising:
   A. housing means having an axially extending inlet port and a plurality of outlet ports for permitting water to flow through said housing means between said ports, said housing means including groove means for directing the path of said water to flow between said inlet port to said outlet ports, said groove means including a body portion having a centrally disposed axial bore and a top surface with a plurality of radially extending grooves for permitting said water to flow from said inlet port over said body portion, said body portion having a tapered surface extending outwardly and downwardly from said centrally disposed bore,
   B. valve means operatively associated with said inlet port disposed in said body portion bore for controlling the volume of the water flow through the shower head assembly depending on the position of said valve means relative to said inlet port;
   C. temperature responsive drive means disposed within said housing means for detecting temperature changes within a predetermined range coupled to said valve means, said valve means moving to vary the volume of said water flowing from said inlet port responsive to the temperature of said water; and D. pressure plate means having at least one aperture and said pressure plate means disposed adjacent said drive means remote form said outlet ports for desensitizing said temperature responsive drive means from changes in said water supply pressure.

12. The assembly as defined in claim 11, wherein said valve means includes:

a. base means adapted to extend in abutting engagement with said drive means for reciprocal movement, and b. a stem extending outwardly from said base means within said axially extending bore such that upon expansion of said drive means said stem moves into said bore and essentially stops the flow of said water into said inlet port and upon the contraction of said drive means said valve means is retracted by the back pressure of said water.

13. The assembly as defined in claim 12, wherein said stem is dimensioned relative to said axially extending bore such that a minimal flow of said water continues if the temperature of the water becomes excessive and adding cold water cools the drive means contracting it, thereby retracting said stem permitting the increased flow of water through said grooves.

14. The assembly as defined in claim 13, wherein said inlet port is in a first housing member means and said plurality of outlet ports are in a second housing member means.

15. An automatic temperature controlled shower head assembly comprising:

A. first housing member means having an inlet port and a plurality of outlet ports for permitting the water to flow through said housing member means between said ports, said first housing member means having a top end and a lower end with a cavity extending inwardly from said first housing member means lower end, said inlet port extending between said first housing member means top end and said first housing member means cavity;

B. a second housing member means having a top end and a lower end with a cavity extending inwardly from said second housing member means lower end, said outlet port extending between said second housing member means top end and said second housing member means cavity;

C. a plurality of channels formed by a plurality of circumferentially extending spaced apart ribs formed in both of said first and said second housing member means proximate said first housing member means lower end;

D. valve means operatively associated with said inlet port to control the volume of water flow through the assembly depending on the position of said valve means relative to said inlet port;

E. temperature responsive drive means disposed within said housing means with said water flowing thereover, said temperature responsive drive means cooperating with said valve means responsive to temperature changes of said water within a predetermined range, said valve means moving to vary the water flowing through said inlet port dependent upon the temperature of said water;

F. third housing member means having an open top end and a lower end with a cavity extending inwardly from said open top end with a shoulder disposed proximate said open top end, said third housing member means lower end being provided with a plurality of through apertures and a centrally disposed conically-shaped inwardly extending protrusion for dispersing said flowing water; and G. pressure plate means, having at least one aperture, disposed upon said second housing member means shoulder; and H. means for connecting said first housing member means to said third housing member means.

16. A shower head assembly according to claim 15, wherein said means for connecting said first housing member means to said third housing member means is a U-shaped channel means for operatively engaging outwardly extending protrusions provided on the periphery of said first housing member means and said third housing member means.

17. A shower head assembly according to claim 9, wherein said second housing member means lower end includes a centrally disposed through aperture.

18. A shower head assembly according to claim 17, wherein said centrally disposed through aperture has a manually operated retarding means disposed therein for substantially closing off the flow of said water through said pressure plate centrally disposed aperture increasing the pressure on the temperature responsive drive means when said water exceeds a predetermined temperature.

19. A shower head assembly according to claim 15, wherein said at least one aperture on said pressure plate means is centrally disposed.

20. In an automatic temperature controlled shower head assembly having a first member with an inlet port and an outlet port for permitting water to flow therethrough and a cavity extending inwardly from the lower end thereof with a second member having a top end and a lower end with a cavity extending inwardly from the lower end, including plurality of channels being formed by a plurality of circumferentially extending spaced apart ribs disposed on at least one of the members proximate the lower end of the first member, with a valve operatively associated with the inlet port to control the volume of water flow through the assembly depending on the position of the valve relative to the inlet port; a temperature responsive drive having the water flowing thereover; the temperature responsive drive cooperating with the valve responsive to temperature changes of the water, within a predetermined range, to vary the water flowing through the inlet port dependent upon the temperature of the water; a third member has an open top end and a lower end with a cavity extending inwardly from the open top end with a shoulder disposed proximate the open top end, the second member lower end is provided with a plurality of through apertures through which the water exits, and means for connecting the first member to the second member, the improvement comprising:

A. pressure plate means, having at least one aperture, disposed within said shower head assembly positioned downstream from said temperature responsive drive means, for providing a back pressure on said temperature responsive drive means to reduce the effects of reduced input water pressure.

21. A shower head assembly according to claim 20, further including means positioned for essentially closing off said water flow by closing said at least one aperture.

22. A shower head assembly according to claim 20, wherein said at least one aperture on said pressure plate means is centrally disposed.

* * * * *